United States Patent [19]
Palmer et al.

[11] Patent Number: 6,141,355
[45] Date of Patent: Oct. 31, 2000

[54] TIME-SYNCHRONIZED MULTI-LAYER NETWORK SWITCH FOR PROVIDING QUALITY OF SERVICE GUARANTEES IN COMPUTER NETWORKS

[75] Inventors: Douglas A. Palmer; Ronald D. Fellman; Rene L. Cruz, all of San Diego, Calif.

[73] Assignee: Path 1 Network Technologies, Inc., San Diego, Calif.

[21] Appl. No.: 09/222,183

[22] Filed: Dec. 29, 1998

Related U.S. Application Data

[60] Provisional application No. 60/107,430, Nov. 6, 1998.

[51] Int. Cl.[7] .................................................. H04J 3/16
[52] U.S. Cl. ......................... 370/465; 370/235; 370/252; 370/445
[58] Field of Search ................................ 370/235, 236, 370/237, 252, 260, 261, 445, 447, 464, 465, 466, 467, 503, 510, 512

[56] References Cited

U.S. PATENT DOCUMENTS

| | | | |
|---|---|---|---|
| 5,483,530 | 1/1996 | Davis et al. | 370/465 |
| 5,649,100 | 7/1997 | Ertel et al. | 370/252 |
| 5,742,587 | 4/1998 | Zornig et al. | 370/235 |
| 5,825,755 | 10/1998 | Thompson et al. | 370/445 |

*Primary Examiner*—Douglas W. Olms
*Assistant Examiner*—Shick Hom
*Attorney, Agent, or Firm*—Fish & Richardson P.C.

[57] ABSTRACT

A network system for providing efficient transmission of real-time data and non-real-time data between a plurality of network devices, including an arbitration mechanism that provides a low cost and high performance mechanism for delivery of quality of service guarantees for time-sensitive data sharing a local area with non-time-sensitive data. Device adapters are placed at all access points to a local network. The device adapters limit admission rates and control the timing of all packets entering the network. An X-Hub placed at the center of the network provides for transparent, concurrent transport of signals transmitted by device adapters. Collisions may therefore be eliminated for time-sensitive traffic, thereby guaranteeing timely delivery. A common time reference is established for the device adapters and the X-Hub. The time reference defines a frame with a plurality of phases. Each of the phases defines a state of the X-Hub, and a state for each of the device adapters. Each device adapter is allowed to transmit packets of data onto the network directly to one or more destination device adapters, without the possibility of collisions, during a phase in which it is in a cross-connect mode. Each device adapter can also broadcast unscheduled transmissions, usinig a conventional network protocol (such as CSMA/CD), when it is not in the cross-connect mode. The scheduling of phases to support transport of signals in the cross-connect mode can be dynamically altered, in accordance with a signaling protocol, based on unscheduled transmissions using the conventional network protocol when the X-Hub is so configured.

44 Claims, 11 Drawing Sheets

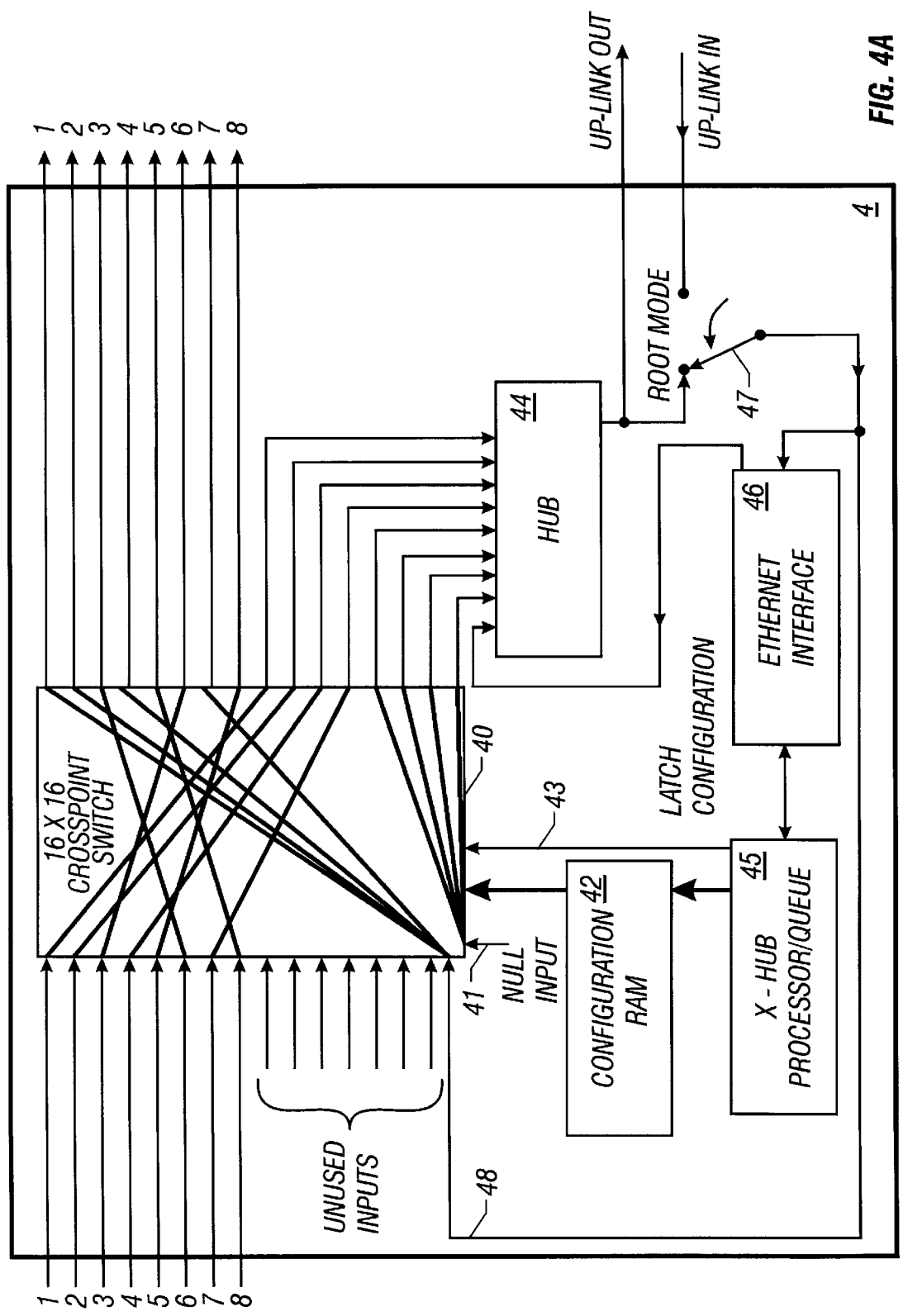

TIME-SYNCHRONIZED MULTI-LAYER NETWORK SWITCH FOR PROVIDING QUALITY OF SERVICE GUARANTEES IN COMPUTER NETWORKS

CLAIM OF PRIORITY

This application claims priority under 35 USC §119(e) to U.S. patent application Ser. No. 60/107,430, filed Nov. 6, 1998.

TECHNICAL FIELD

The invention relates to computer networks, and more particularly, to network apparatus and associated methods that allow real-time traffic such as telephone and video to share a computer network with non-real-time traffic.

BACKGROUND

Computer telephony (that is, the delivery of telephone calls over computer networks) has recently become a focus of attention due to the potential cost savings of sharing such modern high-bandwidth network facilities for multiple uses. Yet, telephone signals are but one member of a larger class of signals known as real-time signals. Computer network traffic from telephone, video, telemetry, and any other time-sensitive signal source are generally referred to as real-time traffic, because such traffic must arrive at a destination within a specified deadline. Audio and video sources typically generate traffic in equally spaced time intervals. This type of periodic real-time traffic is referred to as isochronous traiic. Thus, the cost savings of using modern computer networks for communications goes far beyond computer telephony to benefit all forms of real-time traffic.

The cost efficiency of computer networks derives from in great part from their use of packet switching. Packet switching involves grouping portions of a signal or data stream into data blocks for transmission over network links. These data blocks, called packets, are self-routing because they contain a header with routing information along with a data payload section. Packet switching mixes packets from many sources over a single link in a form of multiplexing. This high-speed link multiplexing contrasts with the circuit switching used by conventional telephone networks. In circuit switching, a communications link is reserved for use by a single signal. Circuit switching delivers information in a predictable, timely manner. However, because packet switching shares each link among many sources, and because computer traffic often contains a broad mix of data to various destinations, packet switching systems can make more efficient use of communications resources than conventional circuit-switched telephone networks. Furthermore, computer networks leverage the mass-production cost savings and technological advances of commodity products. Sharing of high speed computer communications for non-computer signals therefore has the potential to greatly lower the cost of communications when used with telephone-like signals.

However, a problem arises when simply replacing circuit switching with packet switching. Conventional packet switched computer networks were not designed to handle real-time traffic. Collisions and congestion can induce delays and retransmissions, causing real-time traffic to arrive late at a destination and miss deadlines. Furthermore, such collision and/or congestion induced delays are stochastic by nature and therefore unpredictable. Isochronous traffic sources become "bursty" after traveling through such networks. As a result, the quality of telephone calls placed over the Internet and computer networks in general is very poor at present.

A newer alternative to circuit switching, virtual circuit switching, makes use of time division multiplexing (TDM) to share a link among many calls. Like packet switching, virtual circuit switching shares a link with packets traveling to multiple destinations. however, in contrast to packet switching, virtual circuit switching must pre-allocate a TDM channel on a link. Virtual circuit switching reserves the channel regardless of whether or not packets are traversing it, thereby creating a virtual circuit. Virtual circuit switching improves link efficiency, yet still maintains the predictability of circuit switching. In TDM, time is divided into equal length frames and each call has exclusive use of the link during a prescribed portion of each frame. Because each call is guaranteed regular access to the link resources, circuit switched networks may be used to support delivery of real-time traffic. Moreover, circuit switched and virtual circuit switched networks do not require buffering of information at network switches because their routes are predetermined and remain constant and unimpeded throughout the duration of a call. This is in contrast to packet switched networks, in which network switches contain buffers to absorb temporary traffic fluctuations due to the non-scheduled asynchronous nature of offered traffic having a rapidly fluctuating mix of destinations.

A well known example of virtual circuit switching is Asynchronous Transfer Mode (ATM). In ATM, centralized route servers assign a path identifier for each packet, and each network switch along a packet's route, to pre-configure all switches along its route. This protocol reserves resources for the duration of an isochronous session through a combination of a Time Division Multiplexed (TDM) scheduling mechanism and a buffer management mechanism at each network switch.

For computer networks carrying a mix of non-real-time and time-sensitive (real-time) traffic, circuit switched and virtual circuit switched computer networks are inefficient. since in order to guarantee low latency, a real time call must reserve resources on a peak bandwidth basis. Further, call set-up and tear-down is a relatively long process, taking many packet times. The delays in reconfiguring routes through a central server, and the limited number of allowable routes at any given period of time, may result in inefficient link utilization. Thus, for long distance delivery of non-real-time traffic having a wide mix of destinations. circuit switching and virtual switching have a high cost in relation to packet switching. However, virtual circuit switching does have advantages in reduced packet processing times that speed processing for long streams of isochronous traffic to a fixed destination over a fixed route.

The inventors have determined that it would be desirable to transport real-time traffic, together with non-real time traffic, over relatively short distances (e.g. 2 km). Such transport networks are commonly called Local Area Networks (LANs) and are commonly used in corporate intranets. It would also be desirable if such data could be transported over Wide Area Networks (WANs) such as within the Internet.

Currently, the prevalent architectures for LANs are driven by economic cost factors. In particular, the emergence of low cost computers has dictated that a LAN infrastructure have cost at most on the order of the cost of each of the computers. This has led to broadcast-based LAN technology, such as Ethernet. Ethernet is a "packet-switched" protocol that does not require switching or routing, since the medium broadcasts all information to all devices attached to it. The broadcast medium may simply consist of a single coaxial cable with directly connected network devices. Alternatively, the broadcast medium may consist of a simple low-cost hub with separate wires connected between each computer and the hub, in a so-called star topology.

Although the throughput and latency of an Ethernet network may be significantly improved via the use of switches and routers that make use of its packet-switched underpinnings, at its most fundamental level Ethernet uses a broadcast-based media access control protocol. This ability for deployment in a broadcast network, as well as in conjunction with switches and routers, has made Ethernet cost effective and ubiquitous for both small and large networks.

In broadcast-based LANs such as Ethernet, the media access protocol governs which computer may transmit information on the medium at any given time. Ethernet computer networks, in particular, use a form of media access control known as Carrier Sense Multiple Access with Collision Detect (CSMA/CD), also sometimes known as Aloha. This protocol is described in detail by the IEEE Standard 802.3. It provides a very simple and effective mechanism for allowing multiple packet sources to share a single broadcast computer network medium.

To transmit a new packet using CSMA/CD, a transmitter need first sense that that the network is idle. The transmitter must listen for packets on the network and can only transmit if no packet is currently being transmitted. Since a transmitted packet is broadcast to all receivers on the local network, listening for network activity is trivial. If a transmitter wishing to send a packet senses that a packet is currently being transmitted, then the transmitter defers transmission until it senses that the network is inactive. Collisions naturally arise as part of this mechanism. The most common scenario leading to a collision is where two or more stations. which are both deferring their own respective transmissions during the transmission of another packet, sense a lack of activity at nearly the same time. The protocol detects collisions, and then aborts and reschedules transmission of all packets for a random time later.

The Ethernet protocol, while simple and effective for computer traffic, introduces collisions and delays as part of its natural operation. Collisions introduce non-deterministic delays for packet transmissions. Ethernet also uses variable-length packet sizes which further exacerbates any problems with collision-induced delays. While unpredictable latencies are usually inconsequential for non-real-time traffic, they can make Ethernet unusable for isochronous and other real-time applications. Such characteristics also affects traffic on WANs and the Internet that must traverse a plurality of Ethernet networks in order to reach a final destination. In a local-area network, severe Ethernet overloading causes the entire network to become saturated with collision-retry attempts, resulting in a significant reduction in throughput. This can render a IAN unusable even for non-real-time traffic.

A current method in the art to improve the throughput efficiency of Ethernet networks configured in a star topology is to replace the Ethernet hub with an Ethernet SWitch. With this method, each computer has private access to a path through the switch, eliminating the potential for collisions. An Ethernet switch reads the packet headers to create temporary connections for each packet and uses buffers to resolve temporary congestion. Typically an Ethernet switch employs a plurality of high speed Ethernet controllers, memory modules, and a processor to process each incoming packet to determine each packets unique switch configuration or route. This method, however, has the drawback that an Ethernet switch is considerably more costly than a hub, and in some cases may cost more than a single computer in the network.

Thus, circuit and virtual circuit switching have advantages for isochronous traffic, where streams of traffic continuously flow to a given destination, while Ethernet broadcast hubs may be the most efficient and least costly approach for non-real-time traffic. In view of the foregoing, there is still a need for a low cost and high performance network apparatus and associated methodology which overcomes the limitations of collision-based broadcast protocols such as CSMA/CD and provides quality of service guarantees for LANs carrying a mixture of real-time and non-real-time traffic. The present invention meets this need.

SUMMARY

The invention provides network apparatus and associated methods for substantially increasing the transmission capacity of collision-based (e.g., CSMA/CD) broadcast networks in a cost-effective fashion, particularly Ethernet LANs with a star topology configuration, such that unpredictable delays are minimized or substantially eliminated for real-time traffic. The invention merges the concepts of circuit switching, virtual circuit switching, and collision-based media access to create an efficient network for carrying a mixture of real-time and non-real-time traffic. This invention makes use of a crossbar switch (sometimes known as a crosspoint switch) in conjunction with a Time Division Multiplexing arrangement for creating very low latency isochronous channels within a collision-based (e.g., CSMA/CD)) network.

The invention is based on the assumption that isochronous traffic tends to appear in sessions with fixed destinations that last for many packet times and therefore do not require the rapid switching of non-real-time packets. The invention incorporates a device at the center of the star topology, herein referred to as an X-Hub, which dynamically provides combinations of point-to-point and multicast, or broadcast connectivity between the network devices attached to the X-Hub. The network devices that are attached to the X-Hub can be prior art CSMA/CD devices, Ethernet hubs with attached prior art CSMA/CD devices, or Device Adapters. A Device Adapter (DA) is also incorporated as part of the invention, and provides an interface to provide communications connectivity to multimedia devices such as video cameras, microphones, video monitors, loudspeakers, industrial sensors, etc. A DA can also provide connectivity for general purpose prior art CSMA/CD devices. The invention provides an arbitration mechanism to control access to the X-Hub for time-sensitive signals and to minimize or substantially eliminate collisions. The invention combines the concepts and advantages of packet switching, circuit switching, and virtual circuit switching.

A basic concept of the invention is that the operation of each DA and the X-hub are all synchronized to a periodic time frame. Two basic time intervals are defined within each repeating frame period. Isochronous traffic is only transmitted during a first time interval during which time virtual circuits are created through the crossbar in the X-Hub and the correspondingly synchronized DAs. During the second time interval, the X-Hub functions as a regular Ethernet repeater, or hub, operating via a conventional broadcast protocol such as a CSMA/CD protocol. This approach allows extremely high throughput for isochronous traffic without the need for reading packet headers, as the routes through the crossbar switch are dynamically setup just prior to the start of an isochronous stream. Thus, the X-Hub acts as a very high throughput switch for isochronous traffic and as a regular broadcast protocol (e.g., Ethernet) repeater for normal non-real-time traffic, while allowing for very low implementation cost by avoiding the complexity of high-throughput packet switching for all traffic.

The first time interval can be further sub-divided into TDM time slots called phases. In one preferred embodiment, the synchronized DAs attached to the X-Hub also sub-divide a first interval into TDM time slots, matched in start time and duration to the phases of the X-Hub. Using this arrangement of DAs, X-Hub, and matching time slots, multiple isochronous data streams or packets from each DA can be switched by a crossbar switch in the X-Hub to multiple destinations without any per packet processing required of the X-Hub. All that is required is to first to set up any isochronous channels by programming a time schedule sequence of crossbar switch settings for each phase.

Multiple X-Hub switches can be cascaded to form very large networks. In one preferred embodiment of a large computer network utilizing this invention, multiple X-Hub switches are arranged in a hierarchical fashion. Such a network scales in size with only an n *(log n) increase in the number of X-Hubs. With many X-Hub switches, choosing routes becomes more complex. One preferred technique for choosing the crossbar switch setting for multiple X-Hub switches at each phase uses a matrix approach. The first step is to construct a series of matrices. A first matrix represents a first phase of a repeating TDM frame for a first crossbar switch along a potential route. The rows of the matrix represent the inputs from source ports at the first X-Hub and the columns represent outputs ports in the downstream direction of a potential destination to a second X-Hub. A second matrix for the first X-Hub is constructed to represent a second phase within a TDM frame. The plurality of matrices, one corresponding to each TDM phase in the TDM frame together form a first set of matrices. A second set of matrices are then constructed for the second X-Hub. The plurality of sets of matrices, one for each X-Hub, together are all used to represent all possible route settings from a source to a destination. A '1' in a matrix corresponds to a used setting and a '0' in a matrix corresponds to a free setting. A free path is then determined from the source to the destination by finding a route of 0's through corresponding matrices from source to destination and next replacing the 0's along a successful path by 1's.

In one aspect, the invention includes a network system for providing efficient transmission of real-time data and non-real-time data between a plurality of network devices, including a switching hub device having input ports and output ports. for transferring packets between selected input ports to selected output ports for transmission on the network; at least one device adapter. each configured to be coupled to at least one network device and to an input port and an output port of the switching hub device, for transmitting packets between at least one of the coupled network devices and the switching hub device; timing synchronization circuitry, coupled to the switching hub device and each device adapter coupled to the switching hub device, for providing common time schedule information to the switching hub device and each such coupled device so as to selectively synchronize transferring of packets by the switching hub device and transmission of packets by each coupled device adapter; and configuration circuitry, coupled to the switching hub device, for periodically setting a configuration of the switching hub device to couple selected pairs of device adapters for direct intercommunication of packets in accordance with such time schedule information during a first time interval.

There are two operating modes of the invention, herein referred to as Conditioned Mode and Annex Mode. In the conditioned mode, only DAs are attached to the X-Hub. Prior art CSMA/CD devices are not directly attached to the X-Hub, but may be attached to DAs, which in turn are attached to the X-Hub. The DAs and the X-Hub operate using a mechanism that is incorporated as part of the invention. In the annex mode, in addition to DAs being attached to the X-Hub, prior art CSMA/CD devices, as well as Ethernet hubs with attached prior art devices, may also be directly attached to the X-Hub. In the annex mode, the X-Hub operates in a slightly different manner as compared to the conditioned mode, in order to accommodate the standard CSMA/CD protocol that is used by the attached prior art devices.

The underlying mechanisms governing conditioned mode are briefly described first. A time reference existing in the X-Hub is distributed to all directly attached DAs. This common time reference is used to define periodically recurring "frames" of time. Each Frame is of fixed duration, and is subdivided into P+1 intervals of time, called phases, which are labeled p=0,1, . . . , P. In each phase of a frame, a DA may be in one of three modes. called hub-tx mode, hub mode, and cross-connect mode.

When a DA is in the hub-tx mode, the X-Hub is configured so that the DA will receive all transmissions from DAs that are also in the hub-tx mode. The X-Hub may also act as an independent transmitter, and transmissions originating at the X-Hub will also be delivered to a DA when it is in hub-tx mode. If more than one DA in the hub-tx mode transmits simultaneously, a collision occurs, garbling the transmission. Collisions can also occur between transmissions originating at the X-Hub and transmissions from DAs in the hub-tx mode. In order to cope with such collisions, each DA may transmit packets in accordance with the CSMA/CD protocol when in the hub-tx mode.

Similarly, when a DA is in the hub mode, the X-Hub is configured so that the DA will receive all transmissions from DAs that are in the hub-tx mode. The difference between hub-tx mode and hub mode is that when a DA is in hub mode, the DA is precluded from transmitting. Thus. when a DA is in hub mode, it may only listen to transmissions (and collisions) from DAs in the hub-tx mode, as well transmissions originating at the X-Hub.

When a DA is in the cross-connect mode, the X-Hub is configured such that any transmissions by the DA will not interfere with any other transmissions in the system. Also. when in the cross-connect mode, a DA will receive transmissions from at most one other DA, the other DA also being in the cross-connect mode. For example, if two DAs are both in the cross-connect mode, then the X-Hub may be configured such that transmissions from one DA are directly routed through the X-Hub to the other DA, and vice-versa. In this case, the DAs are effectively connected by a dedicated bi-directional point-to-point link, immune from interference other transmissions in the system. The X-Hub may also support multicast transmissions from a DA in the cross-connect mode. For example, if three DAs are simultaneously in the cross-connect mode, then the X-Hub may be configured such that transmissions from the first DA are directly routed to both of the remaining two DAs. Each of the remaining two DAs will only "hear" transmissions from the first DA. Typically, DAs in the cross-connect mode may operate in a half duplex mode, i.e., they cannot transmit and receive simultaneously, though this is not necessary.

In general, the internal configuration of the X-Hub may change with each phase. The scheduling and configuration of each phase may be dynamically altered by means of a signaling protocol between the DAs and the X-Hub. The messages of said signaling protocol can be exchanged via the hub and hub-tx modes described above. For example, the initial schedule of the X-Hub may place each DA in the system in hub-tx mode throughout all phases. A DA may then "initiate a call" by communicating via the CSMA/CD protocol, with the X-Hub. As a result of the exchange of signaling messages between the X-Hub and the DA, and the exchange of signaling messages between the X-Hub and one or more destination DAs, the DA may be periodically be placed in the cross-connect mode to create an unshared channel between the DA and one or more destination DAs. Similarly, for example, signaling messages can be used to "tear down" calls after a communications session between two or more DAs. A DA may also exchange packets, or "datagrams" with other DAs via the hub-tx and hub modes, without using the cross-connect mode, for the purpose of transporting non-real time traffic. The cross-connect mode is designed to support quality of service guarantees for latency and throughput for time-sensitive traffic.

In summary, in the conditioned mode, each DA acts as an agent on behalf of multimedia devices and/or general purpose CSMA/CD devices that are connected to it. In particular, a DA may temporarily buffer information until it can be transmitted across the X-Hub. If necessary, a DA may elect to exchange signaling messages with the X-Hub in order to configure or de-configure the X-Hub to periodically carry traffic using the cross-connect mode. This allows highly concurrent access to the X-Hub, significantly increasing the capacity of the network as compared to a CSMA/CD LAN with a central hub/repeater, without the associated economic cost of an Ethernet switch as discussed above. The circuit switched nature of the data transfers by DAs while in cross-connect mode enables the support of quality of service guarantees for delay and throughput. The possible low utilization of link bandwidth associated with circuit switching in general, although an important issue for long distance communications, is not an important issue within the context of this invention. This is because the geographic distances are short and the wires between each DA and the X-Hub are not shared with other DAs.

The operation of the annex mode is similar to the conditioned mode. In this case, a plurality of prior art CSMA/CD devices, and a plurality of Ethernet hubs with attached prior art CSMA devices, are directly attached to the X-Hub. An X-Hub that supports the annex mode has a separate internal hub for combining the traffic from directly attached prior art CSMA/CD devices, as well as from the directly attached Ethernet hubs with associated prior art CSMA/CD devices. Any signal received by the X-Hub from a directly attached prior art CSMA/CD device, or from a directly attached Ethernet hub with associated prior art CSMA/CD devices, will be broadcast by the X-Hub to all directly attached prior art CSMA/CD devices, as well as to all directly attached Ethernet hubs with associated prior art CSM/CD devices. If simultaneous transmissions are detected, a collision re-enforcement signal will be broadcast to all directly attached prior art CSMA/CD devices, as well as to all directly attached Ethernet hubs with associated prior art CSM/CD) devices. The X-Hub will buffer successfully transmitted packets from directly attached prior art CSMA/CD devices, or from directly attached Ethernet hubs with associated prior art CSMA/CD devices. Such buffered packets will be subsequently transmitted from the X-Hub to other DAs, as necessary, using the hub-tx, hub, or cross-connect modes. In effect, an X-Hub that supports the annex mode contains an internal DA to collect and disseminate traffic from directly attached prior art CSMA/CD devices.

In order to accommodate scalability, X-Hubs may be interconnected to form a system which provides a similar functionality to a single X-Hub with a larger number of ports.

The methods and apparatus of the invention provide quality-of-service latency and bandwidth guarantees for time-sensitive signals sharing, for example, an Ethernet network with non-time sensitive signals.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 4a is a block diagram of an exemplary X-Hub of the invention, consisting of an interconnection of a crossbar switch system, a CSMA/CD hub, and a processor with an associated CSMA/CD interface.

Like reference numbers and designations in the various drawings indicate like elements.

DETAILED DESCRIPTION

Figure 1:
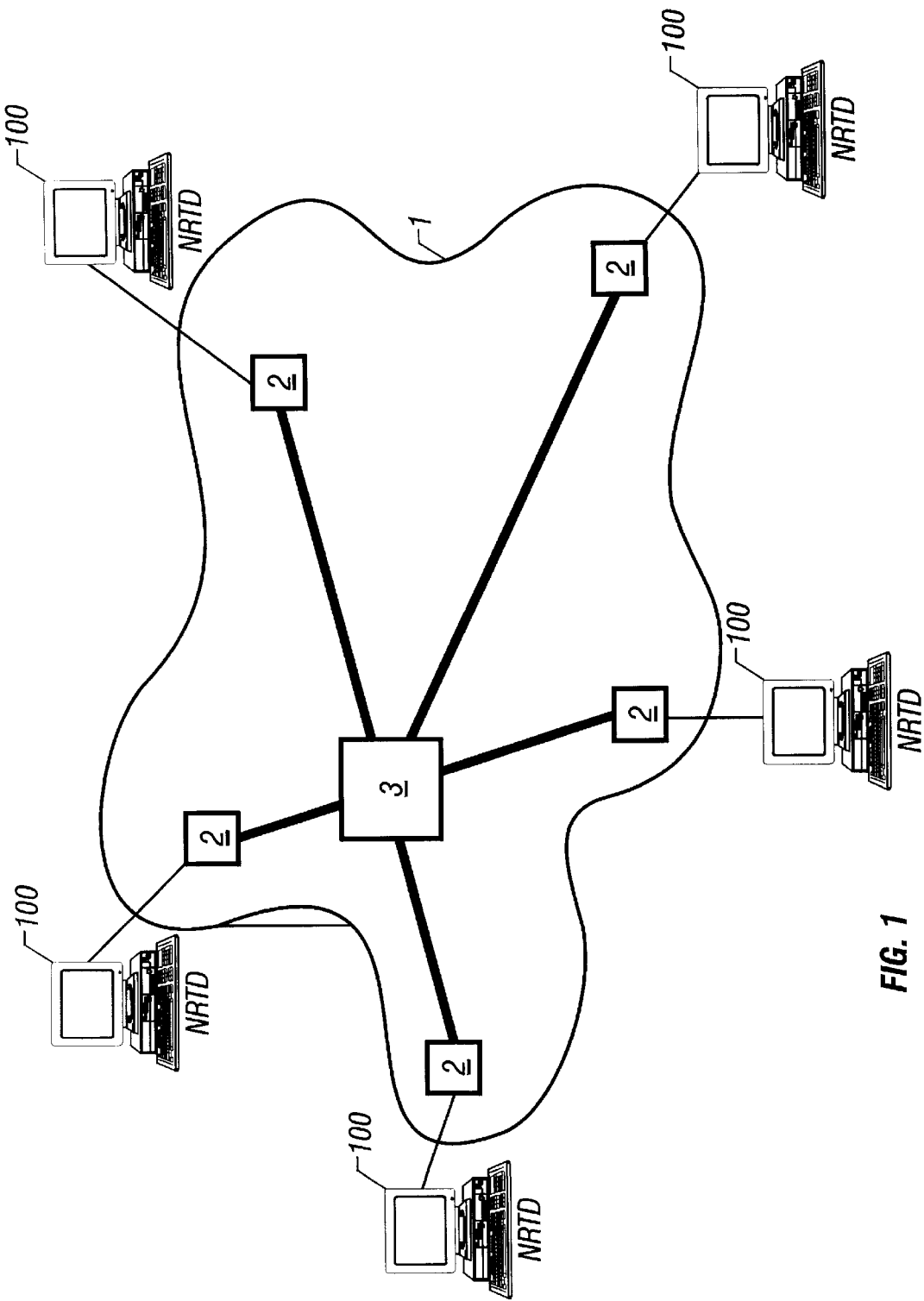
FIG. 1 is a schematic view of a conventional Ethernet network configured in a star topology with a hub at the center.

An example of a conventional Ethernet network 1 is shown in FIG. 1. Conventional Ethernet devices 100, such personal computers without multi-media interfaces and printers, generate non-real-time traffic and are referred to herein as Non-Real-Time Devices (NRTDs). Each NRTD 100 has a standard Ethernet interface and attaches to the conventional Ethernet network 1 through a bidirectional set of wires to a Network Interface Point 2. The Network Interface Points 2 could represent a 10Base-T port or a 100Base-TX port, for example. The Network Interface Points 2 are interconnected by an Ethernet Hub 3. The Ethernet 3 hub broadcasts to each of the attached Network Interface Points 2 any signal heard from the Network Interface Points 2. If more than one Network Interface Point 2 sends signals to the Ethernet hub 3 simultaneously, then the Ethernet hub 3 detects a collision, and sends a collision re-enforcement signal to each of the Network Interface Points 2. These collisions can result in unacceptable latencies for real-time traffic.

Figure 2:
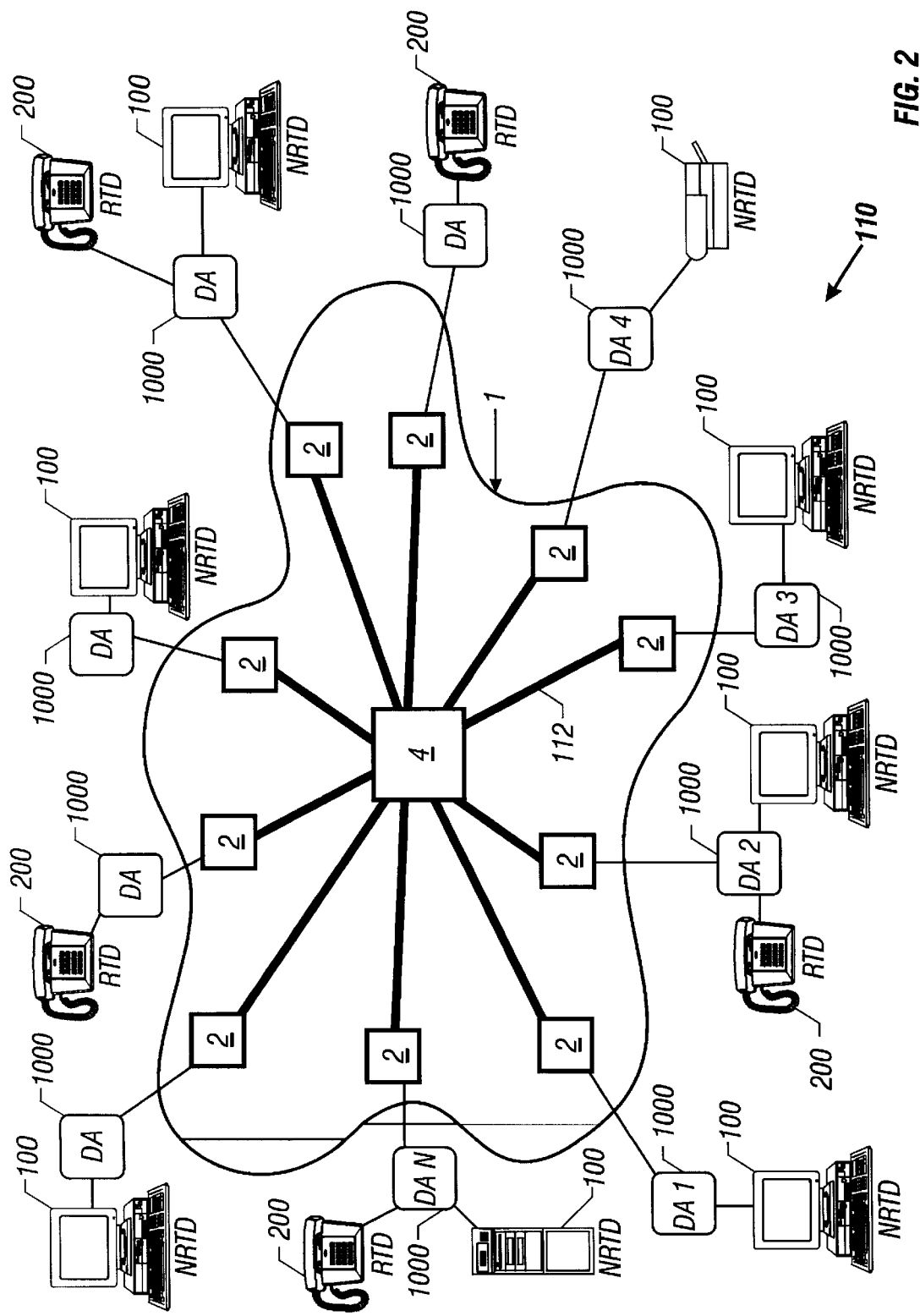
FIG. 2 is a schematic view of an exemplary network in accordance with the invention, particularly illustrating a Conditioned Mode of the network, in which real-time devices and conventional Ethernet devices are attached to Device Adapters, which in turn are attached to an X-hub in a star topology configuration.

Referring to the drawings in more detail, an enhanced network 110 in accordance with the invention is illustrated in FIG. 2. As will be discussed in more detail below, the exemplary enhanced network 110 includes a plurality of devices 100 and 200 for generating real-time and/or non-real-time packets of data for transmission across a network medium 112 to a destination on the network 110. The exemplary network 110 also includes a plurality of device adapters (DAs) 1000 which condition traffic from devices 100 and 200 for transport across an X-Hub 4 to other DAs 1000 and ultimately to other devices 100 and 200. The X-Hub 4 is designed to replace and upgrade an Ethernet hub 3 as in FIG. 1, so the X-Hub 4 preferably provides the same electrical interface to Network Interface Points 2 as does an Ethernet hub 3.

In contrast to an Ethernet hub 3, however, an X-Hub 4 allows concurrent transmissions through several Network Interface Points 2 without resulting collisions, provided that the X-Hub 4 is configured appropriately. Such support for concurrent transmissions results in a significant increase in capacity as compared to a conventional Ethernet network, where only a single transmission through one of the Network Interface Points 2 can occur without a collision. Moreover, as discussed in more detail below, such concurrent transmissions occur in a circuit switched mode. This has three significant benefits. First, since the allowable times for collision-free transmissions occur periodically. QoS guarantees on latency and throughput are naturally provided. Second, the X-Hub has essentially no buffering requirements (although buffering may be provided if desired)). This is in contrast to switched Ethernet LANs. which require switch buffering in order to avoid collisions. Third, concurrent transmissions need not be processed on a packet by packet basis. This is again in contrast to switched Ethernet LANs, where the header of each packet must be read in order determine how to process each packet. These features enable the invention to provide a significantly larger capacity to support QoS guarantees at substantially lower costs than prior art methods.

The network 110 shown in FIG. 2 is configured in "Conditioned Mode," as all traffic placed on the network is conditioned by the device adapters 1000. The invention also includes another mode, called "Annex Mode," which will be discussed in more detail below.

Figure 3:
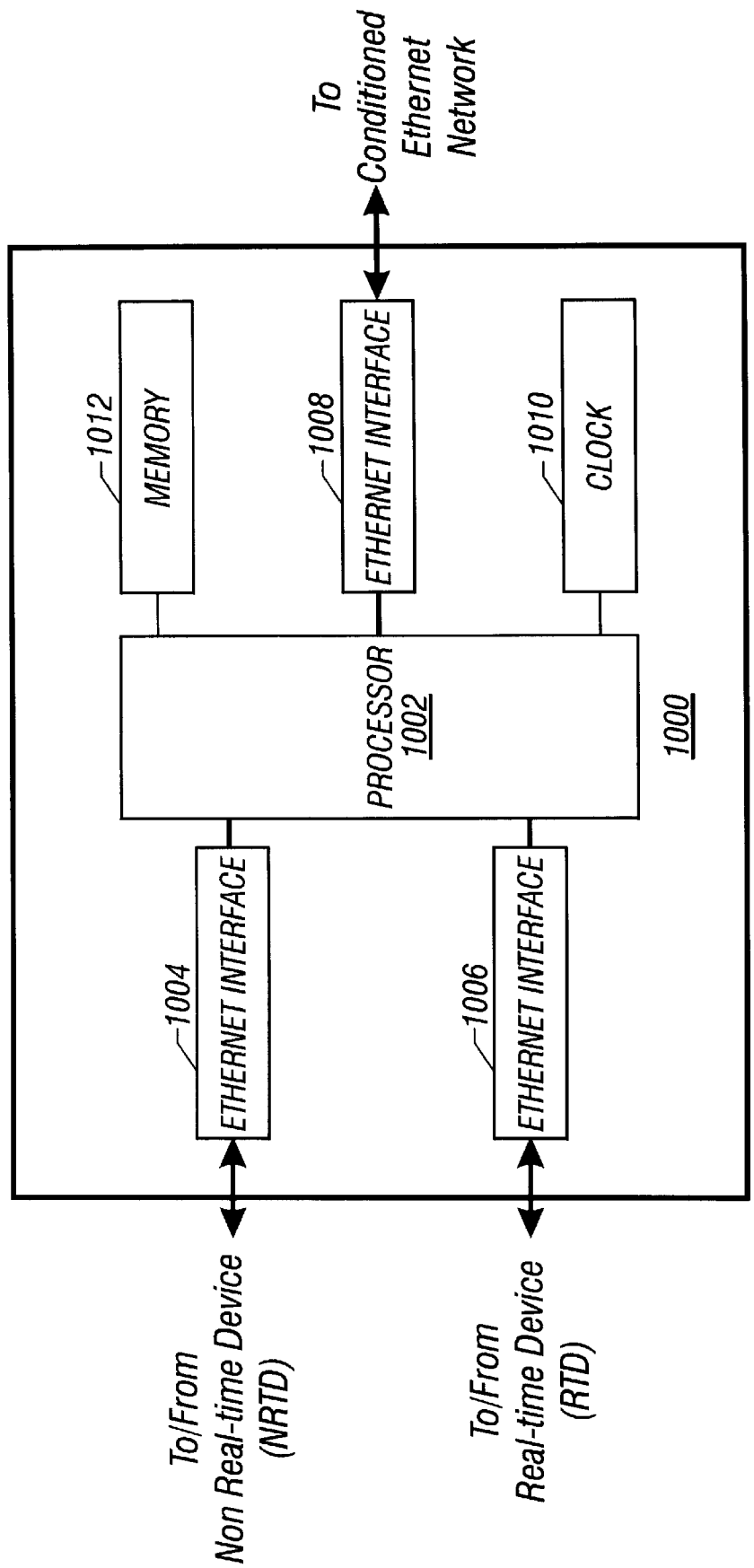
FIG. 3 is a block diagram of an exemplary device adapter of the invention wherein two Ethernet ports, one dedicated to non-real-time traffic and another dedicated to real-time traffic, are mixed onto a third port that conditions an Ethernet link to allow a mixture of real-time and non-real-time traffic.

An exemplary embodiment of a device adapter 1000 of the invention is illustrated in FIG. 3. Exemplary device adapter 1000 includes a processor 1002 and a plurality of interfaces 1004, 1006. and 1008. Interface 1004 is connectable to non-real-time devices 100; interface 1006 is connectable to real-time devices 200; and interface 1008 is connectable to a Network Interface Point 2. Each device adapter 1000 may also include a local clock 1010 such as a crystal oscillator and a memory 1012. The memory 1012 is connected to and controlled by the processor 1002. In addition to the embodiment shown in FIG. 3, the memory 1012 may be connected directly to the device interfaces 1004 and 1006 or to the network interface 1008 for storing both real-time and non-real-time packets prior to transmission.

As will be discussed in more detail below, the processor 1002 operates in accordance with an arbitration mechanism that substantially eliminates collisions of real-time traffic. The device adapters 1000 may be configured as stand-alone devices which may be connected to Network Interface Points 2, the real-time devices 100, and the non-real-time devices 200. Alternatively, the device adapters 1000 may be configured as adapter cards which may be inserted in expansion slots in, for example, computers (illustrated as NRTDs 100 in FIG. 2) connected to the network 1.

The RTDs 200 may output data across a standard Ethernet interface. Conventional telephone and video equipment may be interfaced to the device adapters 1000 through an additional device which formats the output of the conventional equipment into Ethernet packets. Such additional formatting devices may be physically incorporated into the device adapters 1000.

To make efficient use of the network 110, arbitration mechanisms of the invention provide the capability of eliminating collisions and congestion in the network. This is accomplished by establishing a common time reference among the X-Hub 4 and the device adapters 1000, and then using the common time reference to define periods of time when a particular device adapter may transmit packets without the possibility of collisions. More than one device adapter may transmit a packet at the same time without a collision, since the X-Hub 4 may be appropriately configured to directly route different signals to their destinations without mutual interference, as described below.

X-Hub

A preferred embodiment of an X-Hub is illustrated in the block diagram of FIG. 4a. For purposes of this discussion, only 8 external input ports and 8 external output ports of the X-Hub, each labeled 1 through 8. The embodiment consists of a crossbar switch 40, a configuration RAM 42, a processor/queue 45, an Ethernet interface 46, and an Ethernet hub 44.

A crossbar switch 40 has a fixed number of inputs and outputs, 16 of each in this example. The crossbar switch can be flexibly configured so signals appearing on any output port can be selected among any of the signals arriving on a single input port. In particular, each output can independently be configured to follow the signal on a specified input port. It is assumed here that the crossbar switch supports multicast, which means that different output ports may follow a signal that appears on the same input port. It is also assumed that the crossbar switch has an extra input 41, called the broadcast input. Any of the output ports may be independently configured to follow the signal on the broadcast input. The state of the crossbar switch may be controlled by first writing appropriate digital data into a configuration RAM 42, and subsequently asserting the Latch Configuration input 43 to enable the newly written configuration. In this embodiment, this is done by a processor 45. The configuration RAM may be integrated into the crossbar switch 40 and is shown separately here for purposes of explanation only. In this embodiment, the number of output ports of the crossbar switch 40 is twice the number of output ports of the X-Hub 4. Half of the output ports of the crossbar switch directly feed the output ports of the X-Hub 4. The remaining output ports of the crossbar switch 40 feed an Ethernet hub 44. The Ethernet hub 44 has a single output which follows any signal appearing on an input port of the Ethernet hub 44. If more than one signal appears, a collision is detected and the output signal of the Ethernet hub 44 is a collision re-enforcement signal. An up-link output port and uplink output port are provided to support direct interconnection between X-Hubs. If no such interconnections to other X-Hubs are made, the X-Hub is said to be in "root mode," and the switch 47 connects the output of the Ethernet hub 44 to drive the network input to an Ethernet interface 46, as well as an input 48 of the crossbar switch. If the X-Hub is interconnected to another X-Hub via the up-link ports, the signal appearing at the up-link input port is routed through the switch 47 to drive the network input to an Ethernet interface 46, as well as the input 48 of the crossbar switch. For example, a mechanical sensor that detects the presence of a connector plug may control the switch 47. The Ethernet interface is controlled via the processor 45 through an appropriate interface. The network output of the Ethernet interface 46 drives an input to the Ethernet hub 44. The input ports of the X-Hub directly drive a subset of the inputs of the crossbar switch. A number of other inputs of the crossbar switch are left unused.

Figure 4B:
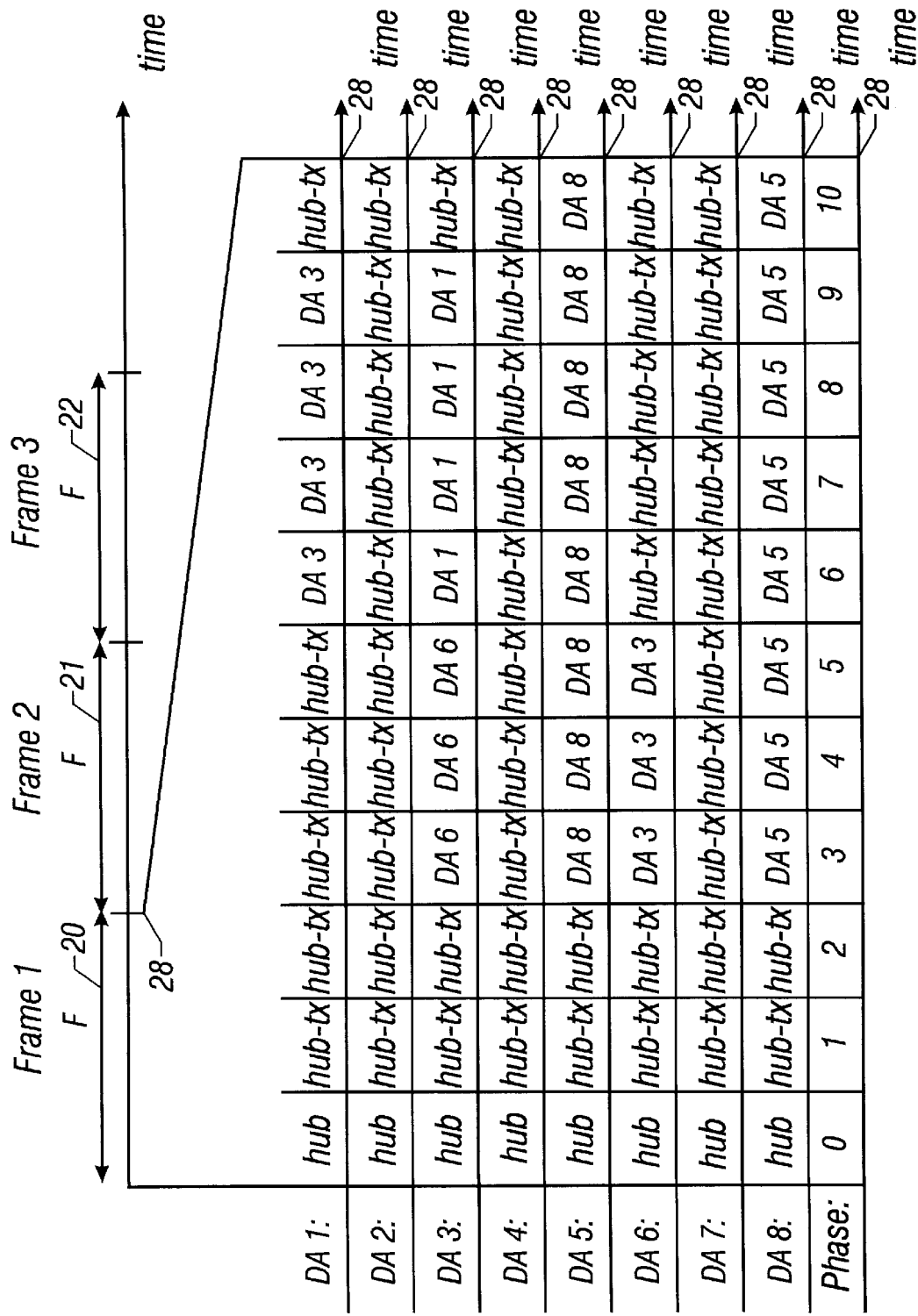
FIG. 4b is a graphical view illustrating the organization of time into repeating frames and phases within each frame that define the interconnection state within the X-Hub.

In order describe the operation of the embodiment of the X-Hub illustrated in FIG. 4a, it is helpful to first assume that the X-Hub operates in root mode, so that switch 47 is connected to the output of the Ethernet hub 44. In order to configure a DA in the hub-tx mode, the crossbar switch is configured so that corresponding input of X-Hub is routed to an input of the Ethernet hub. The signal appearing at input 47 of the crossbar switch, from the output port of the Ethernet hub 44 or the up-link input port, is routed by the crossbar switch to the output ports of the X-Hub that are connected to DAs that are either in the hub-tx mode or in the hub mode. The broadcast input 41 of the crossbar switch is fed with a null signal and is routed to all input ports of the Ethernet hub that are not fed by an input port of the X-Hub. The connectivity required by DAs in the cross-connect mode is directly implemented by appropriately configuring the crossbar switch . . . As mentioned above, the network of the invention includes a plurality of device adapters 1000, which plurality is represented by N. The device adapters 1000 may then be respectively indicated by DA1, DA2, DA3, . . . DAN. It is assumed here that DAn is connected to input port n and output port n of the X-Hub. In FIG. 4a, an example configuration of the crossbar switch is illustrated by lines drawn between inputs and outputs within the rectangle representing the crossbar switch. In this example, DAs 1,2,4, and 7 are in hub-tx mode, while DAs 3,5,6, and 8 are in cross-connect mode. In particular, DAs 3 and 6 are provided direct connectivity to one another, and DAs 5 and 8 are provided direct connectivity to one another The operation of the system with respect to time is illustrated graphically by way of example in FIG. 4b. Referring to FIG. 4, time is divided into equal length frames 20, 21, and 22 of duration F, for example, 25 ms. Only three exemplary frames 20, 21, and 22 are shown, however, the frames repeat at a periodic rate. For purposes of this discussion, an embodiment of the network 110 includes eight device adapters, i.e., N=8. Relative to the common time reference, the frame boundaries are at times t=nF, where n is an integer. For purposes of explanation, it is convenient to divide a frame into phases, labeled p=0,1,2, . . . , P, where P is an integer constant parameter, where P=10 is assumed in this discussion. The first frame 20 shown, ending at time 28 is expanded. For this frame, there are nine time lines shown. The bottom time line indicates the phases, 0,1,2, . . . , 10, of the frame. The eight remaining time lines indicate the state of each DA within each phase. As depicted in the FIG. 4b, all DAs are in the hub mode during phase 0. In this example, phase 0 is reserved for transmissions originating at the X-Hub. This could include, for example, synchronization messages. As can be observed from FIG. 4b, DA 2, DA 4, and DA 9 are in the hub-tx mode for all phases except phase 0. DA 5 and DA 8 are in the cross-connect mode in phases 3 through 10, and have a dedicated channel between them during this interval of the frame. Similarly, DA 3 and DA 6 are in the cross-connect mode and have a dedicated channel between them during phases 3,4, and 5. Finally, DA 1 and DA 3 are in the cross-connect mode and have a dedicated channel between them during phases 6,7,8, and 9. The state of the X-Hub during phases 3,4, and 5 is consistent with the state of the crossbar switch illustrated in FIG. 4a.

Figure 5A:
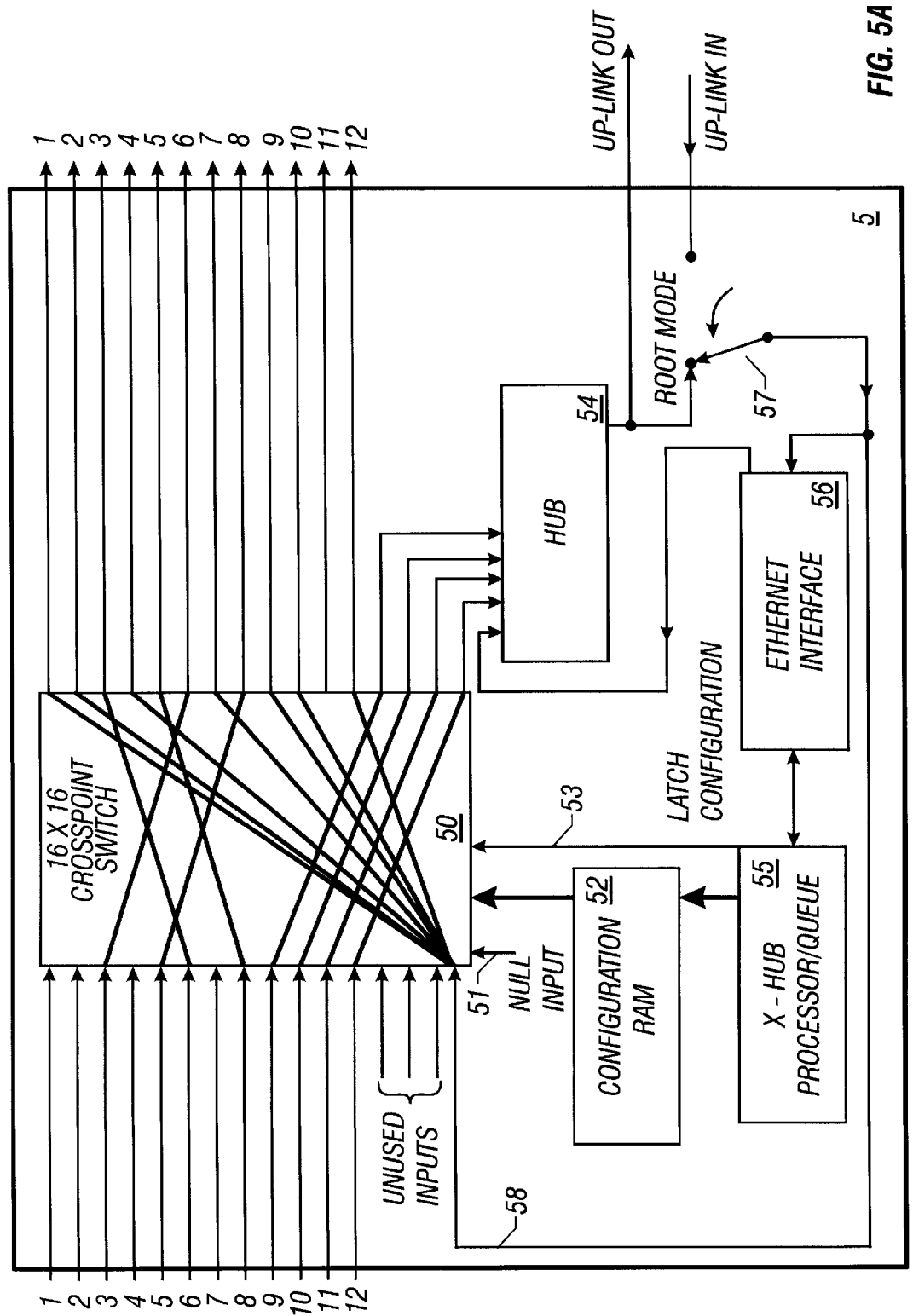
FIG. 5a is a block diagram of an alternative embodiment of an X-Hub, utilizing an internal CSMA/CD hub that has less inputs than the number of external ports of the X-Hub.
Figure 5B:
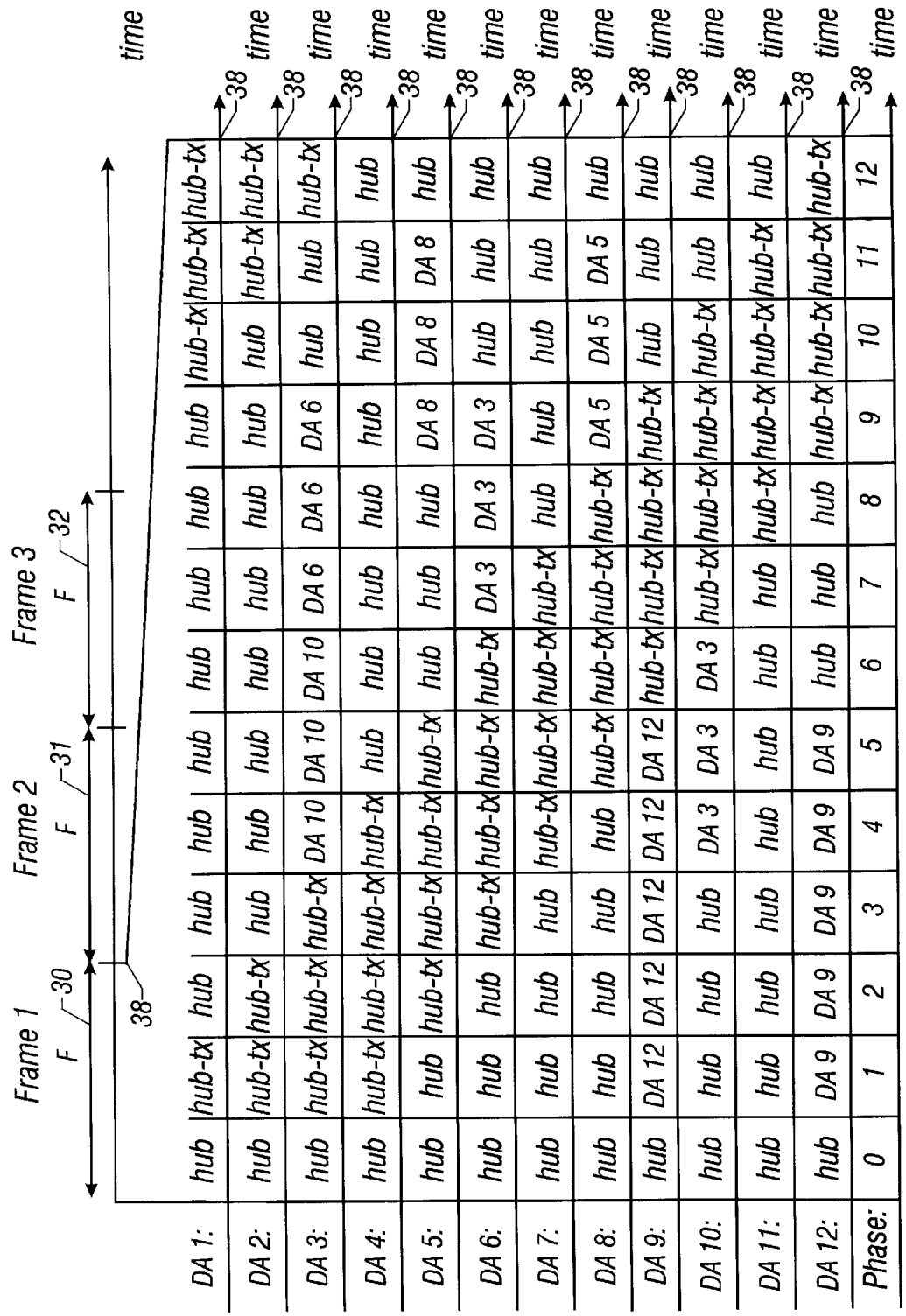
FIG. 5b is a graphical view illustrating the organization of time into repeating frames and phases within each frame that define the interconnection state within the X-Hub, particularly illustrating how the internal CSMA/CD hub within an X-Hub may be time shared among the attached DAs.

An alternative embodiment of a X-Hub is shown in FIG. 5a, which is similar to that in FIG. 4a, except that a smaller Ethernet hub 54 is used. This allows additional X-Hub ports to be supported for the same crossbar switch size (four, in the illustrated embodiment), as compared with the embodiment in FIG. 4a. As a result, only up to four DAs can be in the hub-tx mode in each phase. Each DA must be in the hub-tx mode for a portion of each frame, to accommodate signaling and transport of datagram messages. This implies that the Ethernet hub 54 must be time shared among the DAs. An example of the operation of system with respect to time, using an X-Hub 5 with the embodiment illustrated in FIG. 5b, which entirely analogous to FIG. 4b. In this example, there are 13 phases within the frame 30. As before, phase 0 is reserved for transmission originating at the X-Hub, and will DAs are in the hub mode during this time. In phase 1, DA 1 through DA 4 are in the hub-tx mode. In phase 2, DA 2 through DA 5 are in the hub-tx mode. This pattern continues. such that each DA is in the hub-tx mode for four phases during the frame 30. During phases 1 through 5, DA 9 and DA 12 are in the cross-connect mode with a dedicated channel provided by the X-Hub. DA 3 is in the cross-connect mode during phases 4 through 9, having a channel with DA 10 during phases 4 through 6, and having a channel with DA 6 during phases 7, 8, and 9. Finally, during phases 9,10, and 11, DA 5 and DA 8 are in the cross-connect mode with a dedicated channel provided by the X-Hub. The state of the X-Hub during phase 9 is consistent with the state of the crossbar switch illustrated in FIG. 5a. In general, an embodiment of an X-Hub as in FIG. 5a allows more ports to be supported (e.g., 8 ports in FIG. 4a versus 12 ports in FIG. 5a), for a given size of a crossbar switch. The disadvantage of this that each DA will have less opportunity to be in the hub-tx mode for transport of datagrams and signaling messages. On the other hand, use of the cross-connect mode will decrease amount of time that a DA needs to be in hub-tx mode.

Annex Mode

Figure 6:
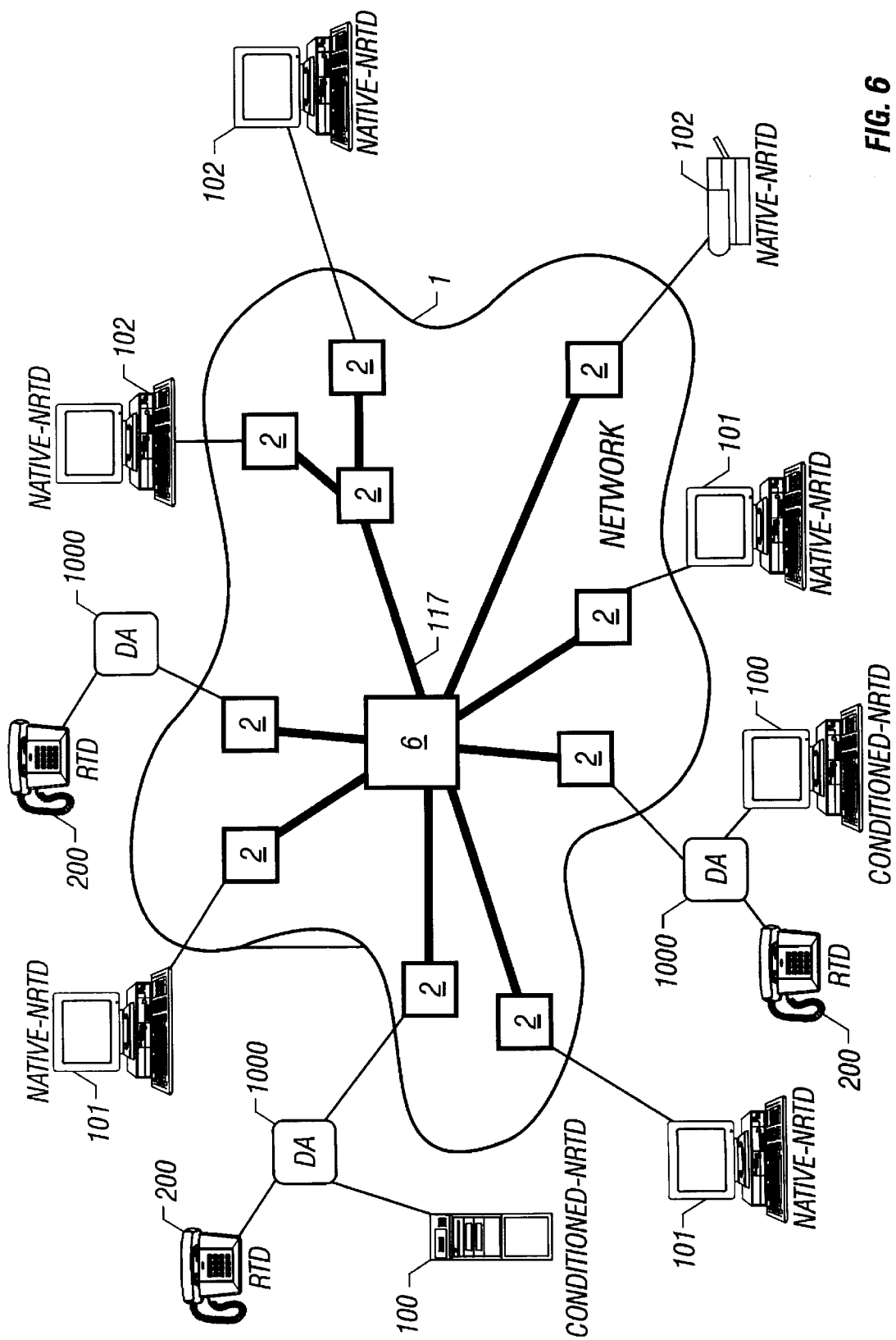
FIG. 6 is a schematic view of an exemplary Ethernet network in accordance with the invention, particularly illustrating an Annex Mode of the network, in which conventional Ethernet devices are directly attached to the X-Hub.

As mentioned above, in addition to Conditioned Mode, the network of the invention operates in Annex Mode. With reference to FIG. 6, the network operates in Annex Mode when the device adapters 1000 of the invention coexist with non-real-time devices (NRTDs) 101 that are attached directly to the X-Hub 6 via network interface points 2, which devices are known as native NRTDs 101. Standard Ethernet hubs 3, with attached prior art CSMA/CD devices 102, may also be directly attached to the X-Hub 6. Such devices 102 are also called native NRTDs. An Ethernet hub is attached 117 to the X-Hub through an "uplink" or "cascade" port of the Ethernet hub. In particular, the signal leaving from the uplink or cascade port of an Ethernet hub 3 is gathered from the signals incident to the Ethernet hub 3. The signal entering the uplink or cascade port of an Ethernet hub 3 is broadcast to all output ports of the Ethernet hub 3. With this functionality, the incoming and outgoing uplink ports of an Ethernet hub 3 may be directly fed to one of the inputs of an X-Hub.

Figure 7:
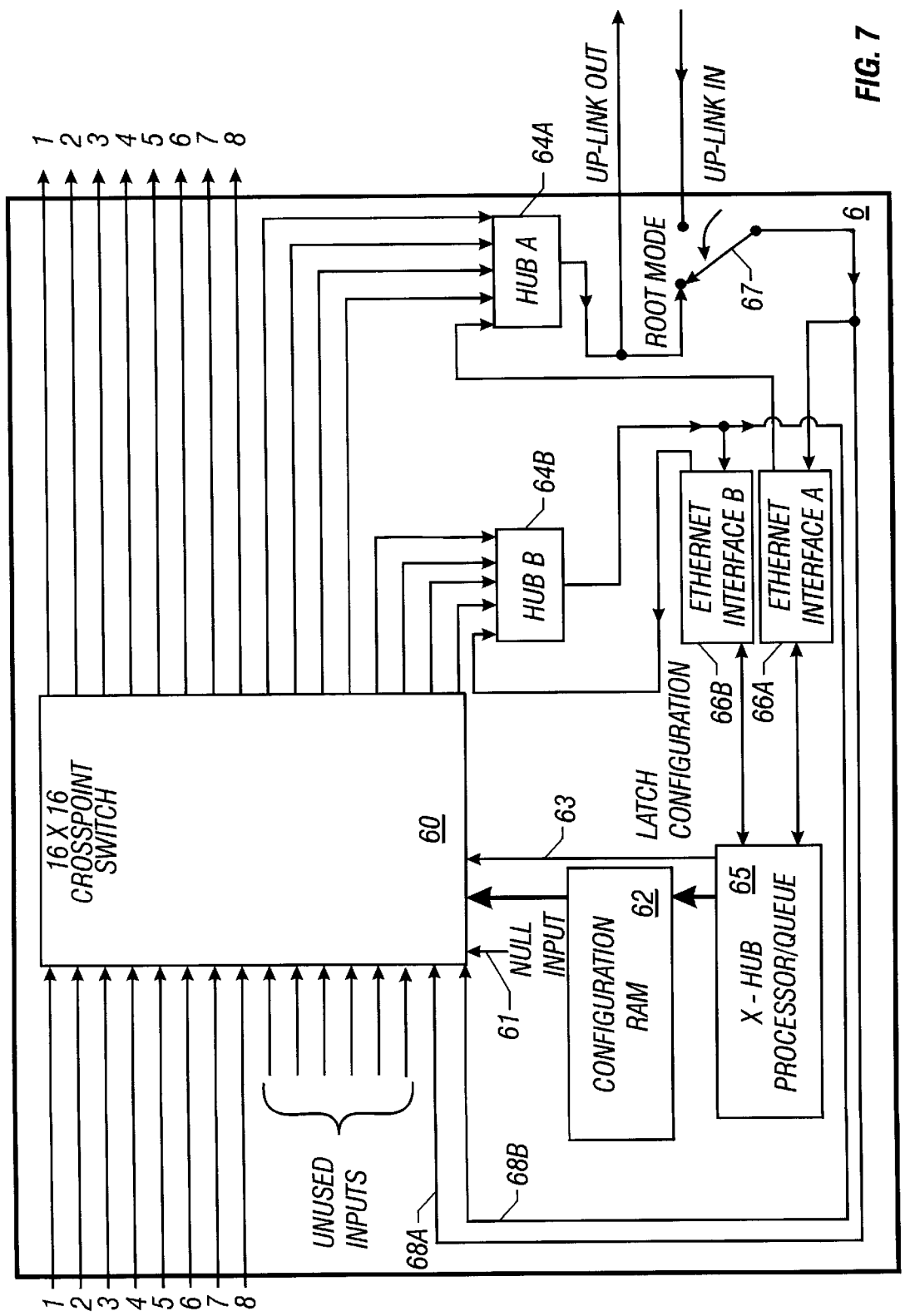
FIG. 7 is a block diagram of an alternative embodiment of an X-Hub that supports the Annex mode of the invention, utilizing an additional hub and an additional CSMA/CD interface.

An embodiment of an X-Hub that supports the Annex mode is depicted in block diagram form in FIG. 7. This embodiment is similar to those depicted in FIG. 5a and FIG. 6a, except that an additional Ethernet hub 64B is used to collect together signals from Native NRTDs 102. An additional Ethernet interface 66B is used by the X-Hub to receive and store Native NRTD packets, so that they may subsequently delivered to a directly attached DA. Ethernet Hub 64A is used in a manner analogous to the Ethernet Hub 54 in FIG. 5a.

Figure 8:
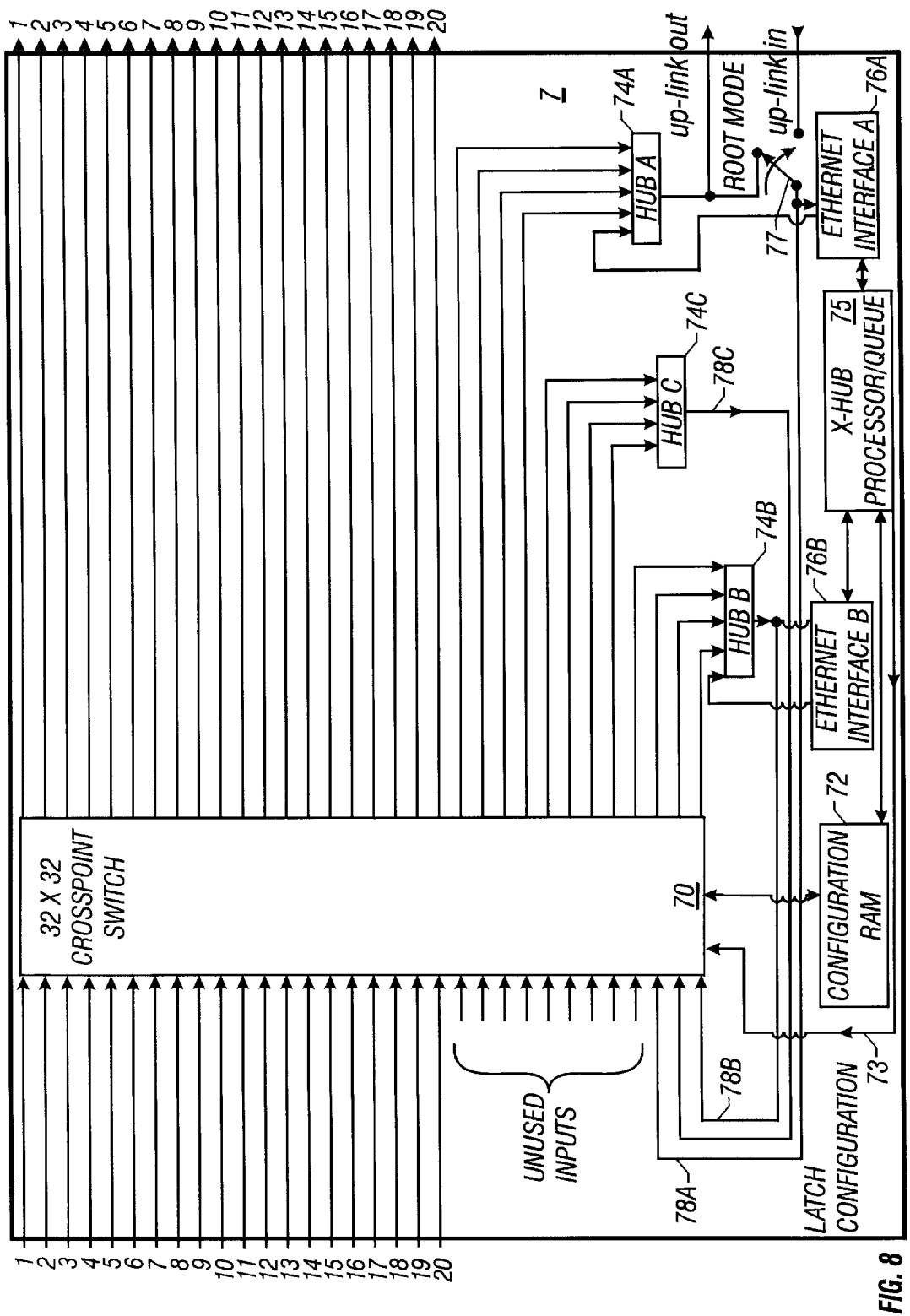
FIG. 8 is a schematic view of an example interconnection of X-Hubs to form a larger system that has the same functionality as a single X-Hub.

A further variation of an X-Hub embodiment is illustrated in FIG. 8. This is similar to the embodiment in FIG. 7, except that an additional hub 74C is used. This hub 74C can be "ganged together" with either the Ethernet hub 74B used for gathering signals from Native-NRTDs 102, or the Ethernet hub 74A used for gathering signals from DAs in the hub-tx mode. In the former case, the output signal from the Ethernet hub 74C is fed back 78C through the crossbar switch and is routed to one of the input ports of Ethernet hub 74B. In the latter case, the output signal from the Ethernet hub 74C is fed back 78C through the crossbar switch and is routed to one of the input ports of Ethernet hub 74A. This provides a degree of flexibility to adapt to the number of Native NRTDs that may be feeding the X-Hub 7, as well as the flexibility to adapt to the frequency at which DAs need to be in hub-tx mode.

Scalability of X-Hubs

Figure 9:
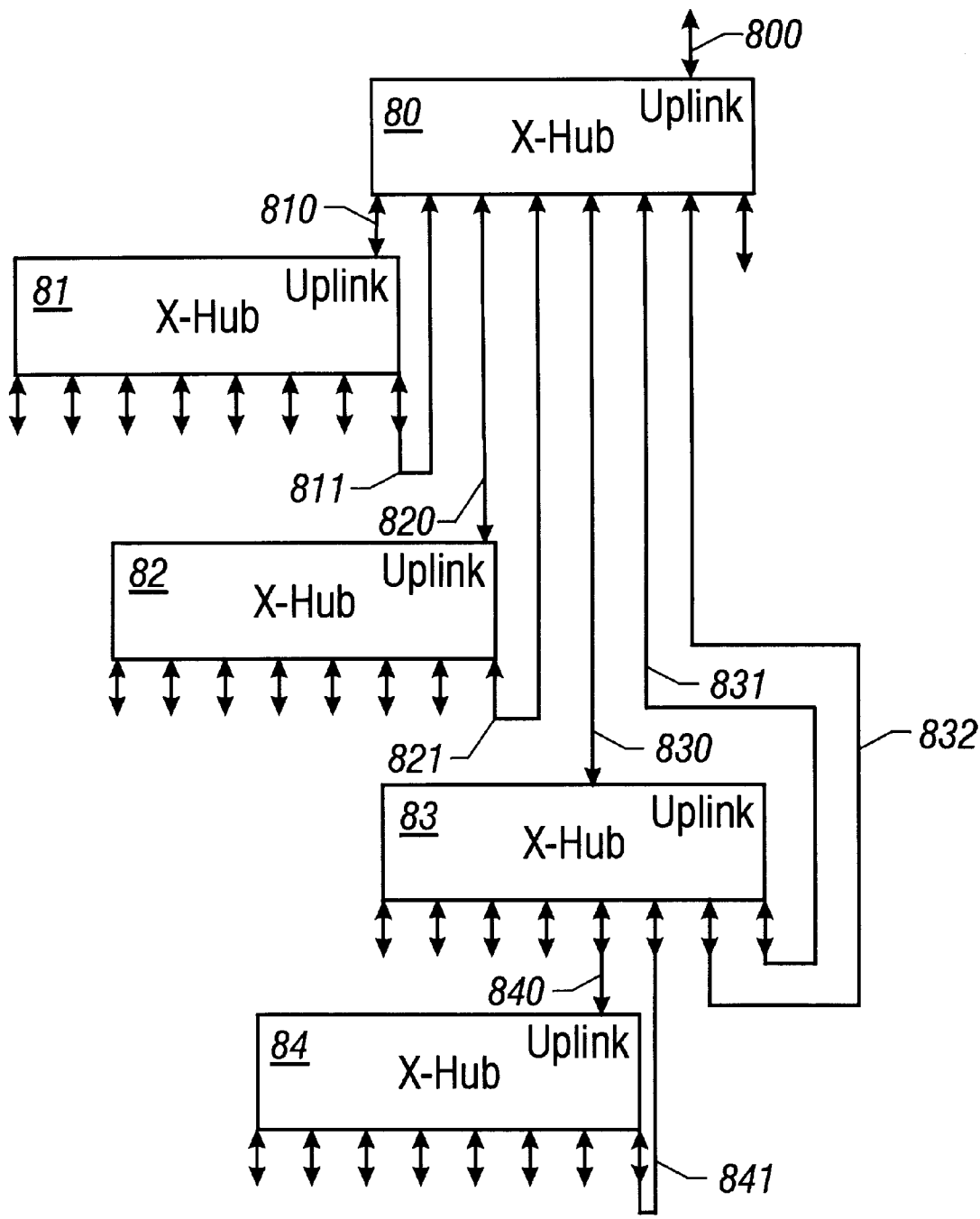
FIG. 9 is a block diagram of interconnections of multiple X-Hubs to form a larger system with a similar functionality.

As noted above, X-Hubs can be equipped with "uplink" ports to facilitate interconnection of two or more X-Hubs to form a larger system with a similar functionality. This is illustrated by way of example in FIG. 9. The embodiments of the X-Hub shown in FIG. 4a, FIG. 5a, FIG. 7, and FIG. 8 support the interconnection of X-Hubs in a tree topology. In FIG. 9, X-Hub 80 serves as the "root" of the tree. In particular, since there are no connections to the uplink port 800 of X-Hub 80, the X-Hub 80 is configured in the root mode, as discussed previously. The X-Hub 81 is connected to X-Hub 80 via the uplink ports of X-Hub 81 and an input and output port of X-Hub 80. Similarly, X-Hub 82 and X-Hub 83 are "children" of X-Hub 80. and X-Hub 84 is a "child" of X-Hub 83. The internal hubs of each X-Hub that gather together the signals of DAs that are in the hub-tx mode are effectively "ganged" together to form a larger hub. Specifically, each of the X-Hubs operates with a common frame and phase structure, relative to a global time reference. During a given phase, all DAs that are in the hub-tx mode, even if they attach to different X-Hubs, are joined together such that each such DA can hear the transmissions of all other such DAs. Furthermore, all DAs that are in the hub mode, even if they attach to different X-Hubs, can also hear the transmissions of all DAs in the system that are in hub-tx mode. Furthermore, a successful transmission by a DA in the hub-tx mode is simultaneously broadcast to the processor in each X-Hub through an internal Ethernet interface within each X-Hub.

In order to facilitate connections between DAs in the cross-connect mode that are directly attached to different X-Hubs, the X-Hubs may have additional interconnections between them. For example, the connection 811 supports transport of signals in cross-connect mode between DAs directly attached to X-Hub 81 and X-Hub 80. Connections 821 and 841 provide a similar functionality. In order to facilitate higher capacity interconnections across X-Hubs, more than one "cross-connect" interconnections can be made between X-Hubs. For example, two connections, 831 and 832, are provided between X-Hub 80 and X-Hub 83 in order to facilitate transport of signals in the cross-connect mode.

For the case where Annex Mode is supported by X-Hubs, an interconnection of X-Hubs as in FIG. 9 has the following additional property. Specifically, the internal Ethernet hubs within X-Hubs that gather together signals from Native-NRTDs are not ganged together. Instead, an internal Ethernet hub of an X-Hub gathers together only signals from Native NRTDs that are directly feeding the X-Hub. This local gathering of such signals distributes the required processing of Native-NRTD packets across the X-Hubs, providing a load balancing effect.

Obtaining a Time Reference

One exemplary mechanism of the invention for obtaining a time reference is to configure the X-Hub 4 so that it transmits a synchronization signal at regular intervals or periodically to synchronize the local clock 1010 of each adapter. For example, the synchronization signal may be sent every predetermined number of frames, such as every hundred frames at the start of a frame, or every predetermined amount of time, such as 12.5 ms or 25 ms.

In addition, a device adapter may predict or measure the drift of its local clock 1010 with respect to the clock xx of the X-Hub. The device adapter may then use this drift measurement to adjust its local clock 1010 at regular intervals between synchronization signals from the master device adapter. This technique allows the X-Hub to transmit synchronization signals at less frequent intervals yet still adequately compensate for local oscillator drift. For example. if the local clocks 1010 are crystal oscillators, then the device adapter may predict the drift with relative accuracy. If the drift is predicted to be about 60 $\mu$s for every second, then for a frame having a length of 25 ms, each device adapter would adjust its local clock by 1.5 $\mu$s per frame, or equivalently, by 60 $\mu$s after each 40 frames. If 60 $\mu$s of clock mismatch are required, then this technique may significantly extend the time interval between master synchronization signals to far longer than one second. Alternatively, this technique may provide for a significant tolerance to loss or delay of a synchronization signal.

By definition if at a given point in time the common time reference is t, then each of the device adapters 1000 knows the value of t to within a bounded error e, and the absolute value of the difference between the estimates of the common time reference at any two device adapters 1000 is upper bounded by e.

Timing Errors

In the above descriptions, each of the device adapters had knowledge of the common time reference, and propagation delays were ignored. If the timing error is bounded by e in the sense described above, then the operation of the timing mechanisms can be modified by putting "guard times" between phases to prevent misalignment errors. The guard times should be the summation of at least e and the maximum propagation delay between two stations in the network. In a hub-based local network, each the device adapters 1000 may estimate their propagation delay to the hub by measuring the delay from the time a signal is sent to the hub to the time the signal is looped back to the device adapter 1000. The device adapters 1000 may accordingly adjust their transmissions so that the guard times between owned phases can be reduced. The modifications to the preferred embodiments to take into account timing errors will be apparent to someone skilled in the art.

Other Embodiments

Those skilled in the art will understand that the embodiments of the invention described above exemplify the invention and do not limit the scope of the invention to these specifically illustrated and described embodiments. The scope of the invention is determined by the terms of the appended claims and their legal equivalents, rather than by the described examples. In addition, the exemplary embodiments provide a foundation from which numerous alternatives and modifications may be made, which alternatives and modifications are also within the scope of the invention as defined in the appended claims.

What is claimed is:

1. A network system for providing efficient transmission of real-time data and non-real-time data between a plurality of network devices, including:
   a switching hub device having a plurality of input ports and a plurality of output ports, for transferring packets between selected input ports to selected output ports for transmission on the network;
   at least one device adapter, each configured to be coupled to at least one network device and to at least one of said plurality of input ports and at least one of said plurality of output ports of the switching hub device, for transmitting packets between at least one of the coupled network devices and the switching hub device;
   timing synchronization circuitry, coupled to the switching hub device and each device adapter coupled to the switching hub device, for providing common time schedule information to the switching hub device and each such coupled device so as to selectively synchronize transferring of packets by the switching hub device and transmission of packets by each coupled device adapter;
   configuration circuitry, coupled to the switching hub device, for periodically setting a configuration of the switching hub device to couple selected pairs of device adapters for direct intercommunication of packets in accordance with such time schedule information during a first time interval.

2. The network system of claim 1, wherein the configuration circuitry configures the switching hub device to operate for a second time interval wherein each device adapter may intercommunicate packets by means of a conventional network protocol.

3. The network system of claim 2, further including at least one network device coupled directly to the switching hub device, wherein each such network device may intercommunicate packets by means of a conventional network protocol during such second time intervals.

4. The network system of claim 1, wherein the configuration circuitry configures the switching hub device to operate such that selected first time intervals are subdivided into at least two phases, wherein at least one coupled device adapter can directly intercommunicate packets with distinct other coupled device adapters during corresponding synchronized phases.

5. The network system of claim 1, wherein the configuration circuitry configures the switching hub device during each first time interval to directly couple selected ones of the input ports to corresponding selected ones of the output ports.

6. The network system of claim 2, wherein the configuration circuitry configures the switching hub device during each second time interval to directly couple each input port that is coupled to said at least one device adapter configured to intercommunicate packets by means of said conventional network protocol to each output port that is coupled to said at least one device adapter similarly configured to intercommunicate packets by means of said conventional network protocol.

7. The network system of claim 2, wherein the conventional network protocol is a carrier sense multiple access with collision detect protocol.

8. The network system of claim 1 wherein the time schedule information is provided through a network link to each device adapter coupled to the switching hub device.

9. A network system for providing efficient transmission of real-time data and non-real-time data between a plurality of network devices, including:
   (a) a switching hub device having input ports and output ports, for transferring packets between selected input ports to selected output ports for transmission on the network;
   (b) at least one device adapter, each configured to be coupled to at least one network device and to an input port and an output port of the switching hub device, for transmitting packets between at least one of the coupled network devices and the switching hub device;
   (c) timing synchronization circuitry, coupled to the switching hub device and each device adapter coupled to the switching hub device, for providing a common time reference to the switching hub device and each such coupled device so as to selectively synchronize transferring of packets by the switching hub device and transmission of packets by each coupled device adapter;
   (d) configuration circuitry, coupled to the switching hub device, for periodically configuring the switching hub device to operate in (1) a first time interval wherein selected pairs of coupled device adapters can directly intercommunicate packets, and (2) a second time interval wherein device adapters may intercommunicate packets by means of a conventional network protocol.

10. The network system of claim 9, further including at least one network device coupled directly to the switching hub device, wherein each such network device may intercommunicate packets by means of said conventional network protocol during the second time interval.

11. The network system of claim 9, wherein the configuration circuitry configures the switching hub device to operate such that selected first time intervals are subdivided into at least two phases, wherein at least one coupled device adapter can directly intercommunicate packets with distinct other coupled device adapters during corresponding synchronized phases.

12. The network system of claim 9, wherein the configuration circuitry configures the switching hub device during each first time interval to directly couple selected ones of the input ports to corresponding selected ones of the output ports.

13. The network system of claim 9, wherein the configuration circuitry configures the switching hub device during each second time interval to directly couple each input port that is coupled to one of the at least one device adapter configured to intercommunicate packets by means of said conventional network protocol to each output port that is coupled to one of the at least one device adapter similarly configured to intercommunicate packets by means of said conventional network protocol.

14. The network system of claim 9, wherein the conventional network protocol is a carrier sense multiple access with collision detect protocol.

15. The network system of claim 9, wherein the time reference includes time schedule information provided through a network link to each device adapter coupled to the switching hub device.

16. A network system for providing efficient transmission of real-time data and non-real-time data between a plurality of network devices, including:

a switching hub device having a plurality of input ports, a plurality of output ports, and a crossbar switch system coupled to each of the respective pluralities of input ports and output ports for transferring packets between selected ones of the input ports to selected ones of the output ports for transmission on a network;

at least one device adapter, each configured to be coupled to at least one network device and to an input port and an output port of the switching hub device through the network, for transmitting packets on the network between at least one of the coupled network devices and the switching hub device;

timing synchronization circuitry, coupled to the switching hub device and each device adapter coupled to the switching hub device, for providing a common time reference to the switching hub device and each such coupled device so as to selectively synchronize transferring of packets by the switching hub device and transmission of packets by each coupled device adapter;

configuration circuitry, coupled to the switching hub device, for periodically configuring the switching hub device to operate in (1) a first time interval wherein selected pairs of coupled device adapters can directly intercommunicate packets, and (2) a second time interval wherein device adapters may intercommunicate packets by means of a conventional network protocol.

17. The network system of claim 16, further including at least one network device coupled directly to the switching hub device, wherein each such network device may intercommunicate packets by means of said conventional network protocol during second time intervals.

18. The network system of claim 16, wherein the configuration circuitry configures the switching hub device to operate such that selected first time intervals are subdivided into at least two phases, wherein at least one coupled device adapter can directly intercommunicate packets with distinct other coupled device adapters during corresponding synchronized phases.

19. The network system of claim 16, wherein the configuration circuitry configures the crossbar switch system during each first time interval to directly couple selected ones of the input ports to corresponding selected ones of the output ports.

20. The network system of claim 16, wherein the configuration circuitry configures the crossbar switch system during each second time interval to directly couple each input port that is coupled to one of the at least one device adapter configured to intercommunicate packets by means of said conventional network protocol to each output port that is coupled to one of the at least one device adapter similarly configured to intercommunicate packets by means of said conventional network protocol.

21. The network system of claim 16, wherein the conventional network protocol is a carrier sense multiple access with collision detect protocol.

22. The network system of claim 16, wherein the time reference includes time schedule information provided through a network link to each device adapter coupled to the switching hub device.

23. A switching hub device having a plurality of input ports, a plurality of output ports, and a crossbar switch system coupled to each of the respective pluralities of input ports and output ports for transferring packets between selected ones of the input ports to selected ones of the output ports for transmission on a network, the switching hub device being adapted to be coupled to at least two device adapters each for transmitting packets between at least one coupled network device and the switching hub device, the switching hub device and each device adapter being substantially synchronized to a selectable time schedule, the switching hub device including configuration circuitry for periodically setting a configuration of the switching hub device to couple selected pairs of device adapters for direct intercommunication of packets in accordance with such time schedule during a first time interval.

24. The switching hub device of claim 23, wherein the configuration circuitry configures the switching hub device to operate for a second time interval wherein each device adapter may intercommunicate packets by means of a conventional network protocol.

25. The switching hub device of claim 24, further including at least one network device coupled directly to the switching hub device, wherein each such network device may intercommunicate packets by means of the conventional network protocol during such second time intervals.

26. The switching hub device of claim 23, wherein the configuration circuitry configures the switching hub device to operate such that selected first time intervals are subdivided into at least two phases, wherein at least one coupled device adapter can directly intercommunicate packets with distinct other coupled device adapters during corresponding synchronized phases.

27. The switching hub device of claim 23, wherein the configuration circuitry configures the crossbar switch system during each first time interval to directly couple selected ones of the input ports to corresponding selected ones of the output ports.

28. The switching hub device of claim 24, wherein the configuration circuitry configures the crossbar switch system during each second time interval to directly couple each input port that is coupled to one of the at least two device adapters configured to intercommunicate packets by means of said conventional network protocol to each output port that is coupled to one of the at least two device adapters similarly configured to intercommunicate packets by means of said conventional network protocol.

29. The switching hub device of claim 24, wherein the conventional network protocol is a carrier sense multiple access with collision detect protocol.

30. A method for providing efficient transmission of real-time data and non-real-time data between a plurality of network devices, including the steps of:

providing a switching hub device having a plurality of input ports and a plurality of output ports, for transferring packets between selected input ports to selected output ports for transmission on a network;

providing at least one device adapter, each configured to be coupled to at least one network device and to one of said plurality of input ports and to one of said plurality of output ports of the switching hub device through a network, for transmitting packets on the network between at least one of the coupled network devices and the switching hub device;

selectively synchronizing transferring of packets by the switching hub device and transmission of packets by each coupled device adapter;

periodically setting a configuration of the switching hub device to couple selected pairs of device adapters for direct intercommunication of packets in accordance with selected time schedule information during a first time interval.

31. The method of claim 30, further including the step of periodically configuring the switching hub device to operate for a second time interval wherein each device adapter may intercommunicate packets by means of a conventional network protocol.

32. The method of claim 31, further including the step of coupling at least one network device directly to the switching hub device, wherein each such network device may intercommunicate packets by means of the conventional network protocol during such second time intervals.

33. The method of claim 30, further including the step of configuring the switching hub device to operate such that selected first time intervals are subdivided into at least two phases, wherein at least one coupled device adapter can directly intercommunicate packets with distinct other coupled device adapters during corresponding synchronized phases.

34. The method of claim 30, further including the step of configuring the switching hub device during each first time interval to directly couple selected ones of the input ports to corresponding selected ones of the output ports.

35. The method of claim 31, further including the step of configuring the switching hub device during each second time interval to directly couple each input port that is coupled to one of the at least one device adapter configured to intercommunicate packets by means of said conventional network protocol to each output port that is coupled to one of the at least one device adapter similarly configured to intercommunicate packets by means of said conventional network protocol.

36. The method of claim 31, wherein the conventional network protocol is a carrier sense multiple access with collision detect protocol.

37. The method of claim 30, wherein the time schedule information is provided through a network link to each device adapter coupled to the switching hub device.

38. A method for providing efficient transmission of real-time data and non-real-time data between a plurality of network devices, including the steps of:

providing a switching hub device having a plurality of input ports and a plurality of output ports, for transferring packets between selected input ports to selected output ports for transmission on a network;

providing at least one device adapter, each configured to be coupled to at least one network device and to one of said plurality of input ports and to one of said plurality output ports of the switching hub device through a network, for transmitting packets on the network between at least one of the coupled network devices and the switching hub device;

selectively synchronizing transferring of packets by the switching hub device and transmission of packets by each coupled device adapter;

periodically configuring the switching hub device to operate in (1) a first time interval wherein selected pairs of coupled device adapters can directly intercommunicate packets, and (2) a second time interval wherein device adapters may intercommunicate packets by means of a conventional network protocol.

39. The method of claim 38, further including the step of coupling at least one network device directly to the switching hub device, wherein each such network device may intercommunicate packets by means of said conventional network protocol during second time intervals.

40. The method of claim 38, further including the step of configuring the switching hub device to operate such that selected first time intervals are subdivided into at least two phases, wherein at least one coupled device adapter can directly intercommunicate packets with distinct other coupled device adapters during corresponding synchronized phases.

41. The method of claim 38, further including the step of configuring the switching hub device during each first time interval to directly couple selected ones of the input ports to corresponding selected ones of the output ports.

42. The method of claim 38, further including the step of configuring the switching hub device during each second time interval to directly couple each input port that is coupled to one of the at least one device adapter configured to intercommunicate packets by means of said conventional network protocol to each output port that is coupled to one of the at least one device adapter similarly configured to intercommunicate packets by means of said conventional network protocol.

43. The method of claim 38, wherein the conventional network protocol is a carrier sense multiple access with collision detect protocol.

44. The method of claim 38, wherein the step of synchronizing includes transmitting time schedule information through a network link to each device adapter coupled to the switching hub device.

* * * * *